June 21, 1938.  A. G. WHITE  2,121,416
CUSHIONED COUPLING FOR TRAILERS
Filed Dec. 8, 1936  2 Sheets-Sheet 1
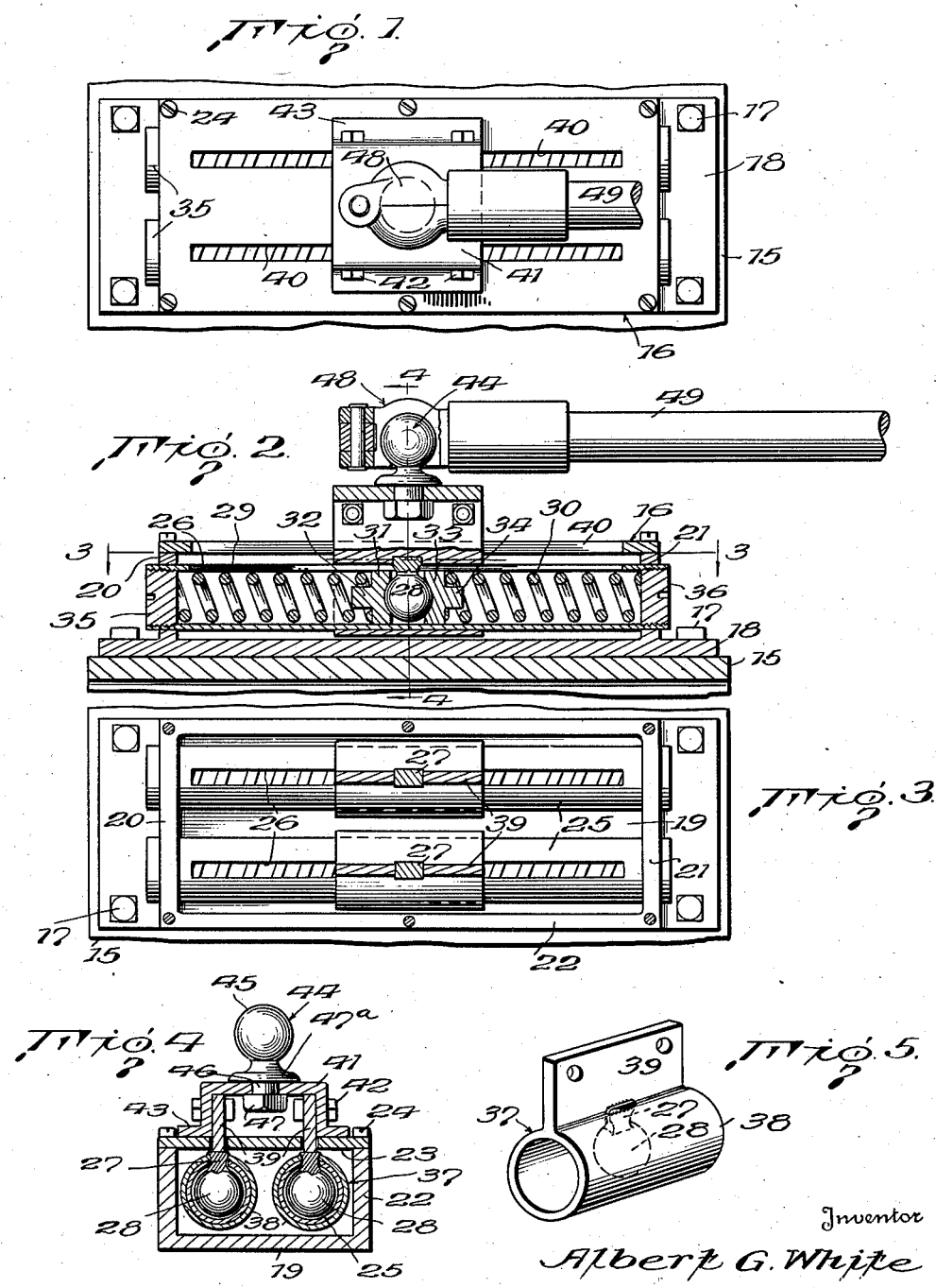

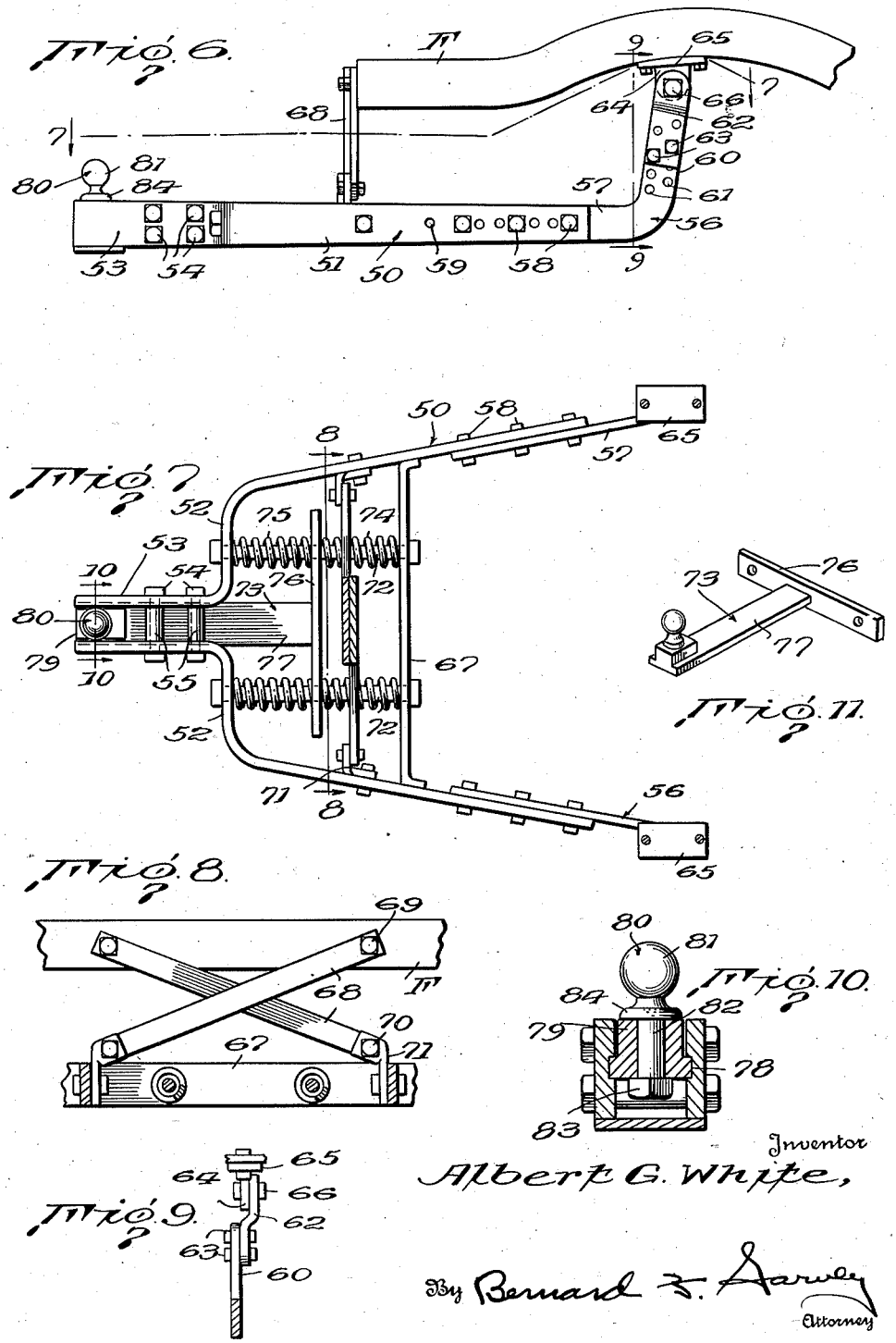

Patented June 21, 1938

2,121,416

UNITED STATES PATENT OFFICE 2,121,416

CUSHIONED COUPLING FOR TRAILERS

Albert G. White, Asheville, N. C.

Application December 8, 1936, Serial No. 114,816

8 Claims. (Cl. 280—33.9)

This invention relates to coupling devices, and more particularly to a cushioned coupling for trailers.

An object of this invention is to provide a draw hitch of the cushioned type which is so constructed that it may be readily mounted on various types of vehicles at present in use, the hitch being so constructed that it may be secured to the body of the vehicle so that the construction of the bumpers or the shape of the vehicle body will not interfere with the coupling of the trailer to the body.

Another object of this invention is the provision of a trailer hitch which may be used with either light or heavy trailer bodies and which will cushion the trailer body in either the forward or backward movement of the vehicle.

A further object of this invention is the provision of a draw means which may be permanently attached to a vehicle body and which includes a coupling member of the universal type which may be readily connected to the usual coupling means provided on the trailer body, the coupling means carried by the vehicle being of the interchangeable type which may be readily changed where necessary to fit the coupling means provided on the trailer body.

A still further object of this invention is to provide a trailer hitch adapted for use with trailers of the two wheel type or of the four wheel type, the hitch being so constructed as to support the front end of the trailer of the two wheel type.

With the foregoing and other objects in view, the invention will be more fully described hereinafter, and will be more particularly pointed out in the claims appended hereto.

In the drawings, wherein like symbols refer to like or corresponding parts through the several views, Figure 1 is a detail top plan of a trailer draw hitch constructed according to an embodiment of this invention.

Figure 2 is a longitudinal section, partly in detail of the structure shown in Fig. 1.

Figure 3 is a sectional view, partly in detail, taken on the line 3—3 of Fig. 2.

Figure 4 is a sectional view taken on the line 4—4 of Fig. 2.

Figure 5 is a perspective view of one of the slide members incorporated in the structure shown in Figs. 1 to 4.

Figure 6 is a detail side elevation of a modified form of this invention, showing the manner of securing the draw hitch to the rear of a vehicle frame, the vehicle frame being broken away.

Figure 7 is a sectional view, partly in detail, taken on the line 7—7 of Fig. 6.

Figure 8 is a fragmentary sectional view taken on the line 8—8 of Fig. 7.

Figure 9 is a sectional view taken on the line 9—9 of Fig. 6.

Figure 10 is an enlarged sectional view taken on the line 10—10 of Fig. 7.

Figure 11 is a perspective view of the slide member embodied in the form shown in Figs. 6 to 10 inclusive.

Referring to the drawings, and first to Figs. 1 to 6 inclusive, the numeral 15 designates a supporting plate which is adapted to be secured by suitable means (not shown) to the body of a vehicle at the rear thereof. This plate 15 may take the form of an elongated bar of suitable length to be secured at one end, the front or forward end, to the body of the powered vehicle, and the rear end of the supporting member 15 is preferably disposed rearwardly of the bumper of the vehicle, although where the construction of the vehicle permits the plate 15 may be disposed between the bumper of the vehicle and the body thereof.

A housing, generally designated as 16, is secured as by bolts 17 or the like to the supporting member 15, the housing 16 being provided with flanges 18 at each end through which the bolts 17 are adapted to extend. The housing 16 comprises a base plate 19, front and rear upstanding walls 20 and 21, respectively, and side walls 22. A removable cover plate 23 is secured as by bolts or screws 24 to the walls 20, 21 and 22.

A pair of tubular guide members 25, of like construction, are secured to the end walls 20 and 21, being disposed in parallel relation and preferably in spaced relation to the base 19 and the cover 23. These guide members 25 may be fastened to the end walls 20 and 21 in any suitable manner, as by welding or other means. The guide members 25 are each provided with elongated slots 26 in the upper portion thereof through which the stem portion 27 of a spring compressing member 28 is adapted to loosely engage. This compressing member 28 is preferably constructed in the form of a spherical member which is disposed within a guide member 25.

Cushioning springs 29 and 30 are positioned within a guide member 25, one on each side of the spherical member 25, and the inner end of the spring 29 engages against a socket 31 which contacts with one side of the spherical member 25. The socket 31 is provided with an axial lug 32 which is disposed within the inner end of the spring 29 in order to properly support the inner end of the spring 29 and prevent twisting of the socket 31 with respect to the ball 28. A second socket 33 engages on the opposite side of the ball 28 and is engaged by the inner end of the spring 30. This socket 33 is also provided with an axial lug 34 disposed within the inner end of the spring 30 to support the spring 30 and prevent twisting of the socket 33. The diameter of the sockets 31 and 33 is such as to slidably engage within the guide members 25.

The front end of each guide member 25 is closed by means of a threaded plug 35 which bears against the forward or outer end of the spring 29, and the rear end of each guide member 25 is closed by means of a threaded plug 36 which bears against the spring 30. These plugs 35 and 36 also provide means whereby the springs 29 and 30 may be tensioned to the desired degree.

A pair of tubular slide members 37 are disposed about the periphery of the guide members 25, there being one slide member 37 for each guide member 25. Each slide member 37 comprises a tubular member 38 provided with a stem 39 extending longitudinally thereof, and the stem 39 extends upwardly through an elongated slot 40 provided in the cover 23. The stem or lug 27 secured to the spring compressing member 28 is positioned within a recess provided in the slide member 37 and is then welded or otherwise fixedly secured thereto. Initially the guide members 25 may be slotted through one end thereof and a plug then inserted and welded within the end of the slot so that the compressing means 27—28 may be fastened within the slide member 37 exteriorly of the housing 16.

The two slide members 37 are fastened together exteriorly of the housing 16 by means of a U-shaped member 41 which is bolted as at 42 to the stem portions 39 of the slide members 37. The U-shaped member 41 is provided with outwardly extending flanges 43 on the ends of the free legs thereof, and the flanges 43 may slidably engage the upper surface of the cover plate 23.

An upstanding attaching member 44 is secured to the central portion of the bight of the U-shaped member 41, and this attaching member comprises a spherical head 45 having a stud 46 engaged by a threaded nut and an annular flange 47a which rests on top of the U-shaped member 41. This attaching member 44 constitutes one portion of a universal connection, the other portion 48 comprising a split socket which is secured to the draw bar 49 forming part of the normal or usual equipment of the trailer body. As will be evident, this attaching member 44 may be varied in size dependent upon the size of the socket 48 carried by the trailer. The changing of the attaching member 44 embodies only the removal of the nut 47 by means of which the attaching member 44 is fastened to the U-shaped member 41.

Referring now to Figs. 6 to 11 inclusive, wherein a modified form of this invention is disclosed, the numeral 50 designates generally a supporting member of substantially V-shape which is attached to the frame of the vehicle at the rear thereof. This supporting member or frame 50 comprises a pair of side bars 51 which are disposed in rearwardly convergent relation, being provided at their rear ends with opposed extensions. The inner or confronting ends of the extensions 52 of the side bars 51 are provided with parallel guide members 53 which are secured together by means of bolts 54, and the guide members 53 are held in spaced apart relation by means of tubular spacing members 55 through which the bolts 54 pass.

The rear end of each side bar 51 has secured thereto an L-shaped bar 56 which on the horizontal leg 57 thereof is provided with a plurality of spaced apart holes to selectively receive adjusting bolts 58 which pass through holes 59 provided in the rear end of each side bar 51. The vertically extending leg 60 of each L-shaped bar 56 is provided with a plurality of holes 61, and the lower end of an angularly bent bar 62 is secured to the leg 60 by means of bolts 63 which extend through selected holes 61. The upper end of the bar 62 is secured to a dependent lug 64 carried by a plate 65 by means of a bolt 66.

The side bars 51 are braced intermediate their ends by means of a bracing member 67 which may be welded, bolted or otherwise fastened to the bars 51. The side bars 51 are maintained in horizontal position by means of crossed supporting bars 68 which are secured at their upper ends as by bolts 69 to a transverse bar forming part of the frame F of the vehicle. The lower ends of the supporting bars 68 are secured as by bolts 70 to angled bars 71 which are bolted or otherwise fastened to the side bars 51. These crossed supporting bars 68 not only support the frame 50 in a horizontal position, but also serve as bracing members to take up any lateral strain caused by the pulling of the trailer around curves or the like.

The frame 50 is provided with a pair of parallel and spaced apart guide bars 72 which are secured between the extensions 52 and the bracing member 67. A slide member 73 slidably engages the guide bars 72, and this slide member 73 is cushioned against movement in either forward or rearward direction by means of springs 74 and 75 which engage on the front and rear sides, respectively of the slide member 73.

The slide member 73 is constructed in substantially T-shape with the head or cross portion 76 thereof extending between the guide bars 72 and provided with suitable guide holes to slidably receive the bars 72. The stem portion 77 of the slide member 73 extends rearwardly between the guide members 53, and the guide members 53 are provided in their confronting faces with guide grooves 78 in which the opposite edges of the stem 77 slidably engage. A block 79 is secured to the rear and upper surface of the stem 77 and is loosely disposed between the guide members 53, and provides a base to which the trailer coupling member 80 is secured.

The coupling member 80 comprises a spherical head 81 having a stud 82 which engages through the block 79, being secured by means of a nut 83. A flange 84 is carried by the coupling member 80 which engages on top of the block 79. This coupling member 80 is part of a universal coupling similar to that disclosed at 44 in Figs. 1 to 4 inclusive, and is adapted to be engaged by a socket similar to that shown at 48 in Figs. 1 and 2 and which is conventionally provided at the forward end of a trailer. The size of the head 81 will depend upon the size of the socket carried by the trailer, and the manner of mounting the coupling member 80 on the slide 73 will readily permit changing thereof to suit the size of the coupling part carried by the trailer.

In the use and operation of this trailer hitch, the coupling member 44 is adapted to be mounted in the socket 48 carried by the draw bar 49 of the trailer, and the housing 16 is secured to the supporting member 15 by means of the bolts 17 or the like. Longitudinal movement of the slide 37 is resisted in either direction by means of the cushioning springs 29 and 30 which may be tensioned by means of the threaded plugs 35 and 36, respectively. The coupling member 44 will permit unlimited horizontal swinging movement of the draw bar 49 relative to the housing 16 in addition to permitting a limited vertical swinging movement thereof.

The structure disclosed in Figs. 6 to 11 inclusive operates similar to the structure shown in Figs. 1 to 5 inclusive, but is adapted for use with vehicles with which the structure shown in Figs. 1 to 5 may not be used.

Obviously changes could be made in the construction herein described without departing from the spirit of the invention, it being only necessary that such changes fall within the scope of the appended claims.

What is claimed is:

1. A trailer hitch comprising a member adapted to be secured to a trailer body, a hollow guide means carried by said member provided with an elongated slot, a slide member engaging about said guide means, a member carried by said slide projecting through said slot in said guide means, springs engaging said latter member and yieldably resisting movement of the slide in opposite directions, a substantially spherical coupling member, and means securing said coupling member to said slide member.

2. A trailer hitch comprising a housing member adapted to be secured to a trailer body, a pair of parallel guide members within said housing member, a slide engaging said guide members, a pair of springs carried by each guide member and engaging on opposite sides of said slide whereby to yieldably resist movement thereof in opposite directions, means for tensioning said springs, a substantially spherical coupling member, and means removably securing said coupling member onto said slide, said latter means slidably engaging said housing.

3. A trailer hitch comprising a housing, means for securing said housing to a trailer body, guide means carried by said housing, slide means engaging said guide means, yieldable means carried by said guide means engaging said slide means and yieldably resisting movement of said slide means on said guide means, means for tensioning said yieldable means, and a coupling means carried by said slide means, said coupling means including means slidably engaging said housing.

4. A trailer hitch comprising a housing provided with an elongated slot therein, means for securing said housing to a trailer body, guide means carried by said housing, slide means engaging said guide means, opposed springs carried by said guide means, means carried by said slide means and engaging between said springs to thereby cushion the movement of said slide means on said guide means, and a substantially spherical coupling means carried by said slide means and extending outwardly through said slot.

5. A trailer hitch comprising a housing, means for securing said housing to a trailer body, a pair of tubular guide members carried by said housing, a pair of opposed springs within each guide member, each of said guide members having an elongated slot therein, a coupling member, and means carried by said coupling member extending through a slot in a guide member and engaging between the opposed ends of said springs to cushion the movement of said coupling member in opposite directions.

6. A trailer hitch comprising a housing, means for securing said housing to a trailer body, a pair of tubular guide members disposed within said housing in parallelism, a pair of opposed springs within each guide member, each of said guide members having an elongated slot therein, a tubular slide member for each guide member, means carried by each slide member and extending through said slot and engaging between the opposed ends of said springs to cushion the movement of said slide member in either direction, a coupling member, and means connecting the slide members together and engaging the coupling member to thereby cushion the movement of said coupling member.

7. A trailer hitch comprising a housing adapted to be secured to a trailer body, a pair of tubular guide members disposed within said housing in parallelism, a pair of opposed springs within each guide member, each of said guide members having an elongated slot therein, a tubular slide member for each guide member, a dependent spring engaging member carried by each slide member and extending through the slot of a guide member, said spring engaging member engaging between the opposed ends of said springs, a vertically disposed extension carried by each slide member, a U-shaped connecting member, means securing said connecting member to said extensions, and a coupling member carried by the bight of said connecting member and extending upwardly thereof.

8. A trailer hitch comprising a housing adapted to be secured to a trailer body, a pair of tubular guide members disposed within said housing in parallelism, a pair of opposed springs within each guide member, each of said guide members having an elongated slot therein, spring tensioning means carried by each guide member, a pair of tubular slide members disposed one on each guide member, a dependent spring engaging member carried by each slide member and extending through the slot of a guide member, said spring engaging member engaging between the opposed ends of said springs, a vertically disposed extension carried by each slide member, a U-shaped connecting member, means securing said connecting member to said extensions, and a coupling member carried by the bight of said connecting member and extending upwardly thereof.

ALBERT G. WHITE.